United States Patent
Dustin et al.

(10) Patent No.: US 11,713,370 B1
(45) Date of Patent: Aug. 1, 2023

(54) ADAPTABLE THERMOSET POLYMERS WITH INTERNAL DYNAMIC BONDS, AND METHODS OF MAKING AND USING THE SAME

(71) Applicant: HRL Laboratories, LLC, Malibu, CA (US)

(72) Inventors: Ashley Dustin, Santa Monica, CA (US); Kevin Drummey, Greensboro, NC (US); Andrew Nowak, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 17/830,310

(22) Filed: Jun. 1, 2022

Related U.S. Application Data (60) Provisional application No. 63/222,046, filed on Jul. 15, 2021.

(51) Int. Cl.
  *C08G 18/10* (2006.01)
  *C08G 18/32* (2006.01)
  (Continued)

(52) U.S. Cl.
  CPC ......... *C08G 18/5024* (2013.01); *C08G 18/12* (2013.01); *C08G 18/3228* (2013.01);
  (Continued)

(58) Field of Classification Search
  CPC ............... C08G 18/5024; C08G 18/12; C08G 18/3228; C08G 18/6685; C08G 18/758; C08G 65/3322; C08G 65/33306
  See application file for complete search history.

(56) References Cited

U.S. PATENT DOCUMENTS 3,929,929 A  12/1975 Keuhn
9,453,099 B2  9/2016 Zhang et al.
(Continued)

FOREIGN PATENT DOCUMENTS

EP  0603716 A1  6/1994
WO  2020115662 A1  6/2020

OTHER PUBLICATIONS

Vinylogous Urethane Vitrimers to Du Prez et al. Adv. Funct. Mater. 2015, 25, 2451-2457.*

(Continued)

*Primary Examiner* — Michael L Leonard
(74) *Attorney, Agent, or Firm* — O'Connor & Company; Ryan P. O'Connor (57) ABSTRACT

The disclosed technology provides improved thermoset vitrimers. It has been discovered that by incorporating adaptable dynamic groups along the polymer backbone, along with permanent, non-dynamic crosslinking points, an improved thermoset vitrimer is generated. In some variations, a thermoset vitrimer comprises: a linear polymer backbone containing associative dynamic covalently bonded species; a crosslinked network containing non-dynamic branch points; and non-dynamic species between non-dynamic branch points and terminal ends of the linear polymer backbone. Some methods comprise: reacting a linear prepolymer with an amine-containing species to form an amine-terminated linear prepolymer; reacting the amine-terminated linear prepolymer with an isocyanate-containing species to form an isocyanate-endcapped linear prepolymer; mixing the isocyanate-endcapped linear prepolymer with a reactive crosslinking agent having a crosslinking functionality of at least 3; and curing the isocyanate-endcapped linear prepolymer with the reactive crosslinking agent, thereby forming a thermoset vitrimer. Experimentally produced thermoset vitrimers demonstrate the ability for self-repair at elevated temperature.

30 Claims, 6 Drawing Sheets

ADAPTABLE THERMOSET POLYMER
WITH INTERNAL DYNAMIC BONDS (51) Int. Cl.
| | |
|---|---|
| C08G 18/50 | (2006.01) |
| C08G 65/332 | (2006.01) |
| C08G 65/333 | (2006.01) |
| C08G 18/66 | (2006.01) |
| C08G 18/75 | (2006.01) |
| C08G 18/12 | (2006.01) |

(52) U.S. Cl.
CPC ....... *C08G 18/6685* (2013.01); *C08G 18/758* (2013.01); *C08G 65/3322* (2013.01); *C08G 65/33306* (2013.01)

(56) References Cited

U.S. PATENT DOCUMENTS

| | | | |
|---|---|---|---|
| 10,246,548 | B2 | 4/2019 | Du Prez et al. |
| 2011/0009265 | A1 | 4/2011 | Voit et al. |
| 2011/0092652 | A1 | 4/2011 | Voit et al. |
| 2015/0025945 | A1 | 9/2015 | Zhang et al. |
| 2015/0259458 | A1 | 9/2015 | Zhang et al. |
| 2017/0327625 | A1* | 11/2017 | Du Prez ............... C08G 83/008 |
| 2018/0312657 | A1* | 11/2018 | Yue .......................... C08J 11/04 |
| 2018/0371183 | A1* | 12/2018 | Guan .................... C08F 230/08 |

OTHER PUBLICATIONS

Reprocceasble vinylogous urethane cross-linked polyethylene via reactive extrusion to Tellers et al. Polym. Chem., 2019, 10, 5534-5542.*

Polydimethylsiloxane quenchable vitrimers to Du Prez et al. Polym. Chem. 2017, 8, 6590-6593.*

Winne et al., "Dynamic covalent chemistry in polymer networks: a mechanistic perspective", Polym. Chem., 2019, 10, 6091.

Taplan et al., "Fast processing of highly crosslinked, low-viscosity vitrimers", Mater. Horiz., 2020, 7, 104-110.

Rekondo et al., "Catalyst-free room-temperature self-healing elastomers based on aromatic disulfide metathesis", Mater. Horiz., 2014, 1, 237-240.

Luzuriaga et al., "Epoxy resin with exchangeable disulfide crosslinks to obtain reprocessable, repairable and recyclable fiber-reinforced thermoset composites", Mater. Horiz., 2016, 3, 241-247.

Capelot et al., "Metal-Catalyzed Transesterification for Healing and Assembling of Thermosets", J. Am. Chem. Soc. 2012, 134, 7664-7667 + Supplementary Information.

Obadia et al., "Reprocessing and Recycling of Highly Cross-Linked Ion-Conducting Networks through Transalkylation Exchanges of C—N Bonds", J. Am. Chem. Soc. 2015, 137, 6078-6083.

Hendriks et al., "Poly(thioether) Vitrimers via Transalkylation of Trialkylsulfonium Salts", ACS Macro Letters 2017, 6, 930-934.

Majumdar et al., "Phosphate Triester Dynamic Covalent Networks", ACS Macro Lett. 2020, 9, 1753-1758.

Ciarella et al., "Understanding, predicting, and tuning the fragility of vitrimeric polymers", PNAS, vol. 116, No. 50, 25013-25022 (Dec. 10, 2019).

Garcia et al., "Dynamic Covalent Polymers", Journal of Polymer Science, Part A: Polymer Chemistry 2016, 54, 3551-3577.

Khosravi et al., "Thermally degradable thermosetting materials", European Polymer Journal 47 (2011) 465-473.

Yang et al., "Detecting topology freezing transition temperature of vitrimers by AIE luminogens", Nature Communications, 2019, 10:3165 (https://doi.org/10.1038/s41467-019-11144-6).

Ishibashi et al., "Mechanical and structural consequences of associative dynamic cross-linking in acrylic diblock copolymers". Macromolecules 2021, 54, 9, 3972-3986.

Spiesschaert et al., "Influence of the polymer matrix on the viscoelastic behaviour of vitrimers", Polymer Chemistry, Royal Society of Chemistry 2020, 11(33), pp. 5377-5385.

Yan et al. "Inverse Vulcanized Polymers with Shape Memory, Enhanced Mechanical Properties, and Vitrimer Behavior", Angew. Chem. Int. Ed. 2020, 59, 13371-13378.

International Search Report and Written Opinion, PCT/US2022/031855, ISA/KR, dated Sep. 27, 2022.

* cited by examiner

ADAPTABLE THERMOSET POLYMERS WITH INTERNAL DYNAMIC BONDS, AND METHODS OF MAKING AND USING THE SAME

PRIORITY DATA

This patent application is a non-provisional application claiming priority to U.S. Provisional Patent App. No. 63/222,046, filed on Jul. 15, 2021, which is hereby incorporated by reference herein.

FIELD OF THE INVENTION

The present invention generally relates to repairable thermoset materials, and methods of making and using the same.

BACKGROUND OF THE INVENTION

Due to their mechanical properties, thermal stability, and resistance to chemicals and environmental stress, thermoset polymers have many applications, such as protective coatings and high-performance materials for aircraft, to name a few. Repairable and healable thermoset polymers are sought as these materials would enable intervention to restore material functionality. However, the inherent irreversible crosslinking in thermosets naturally restricts flow, bond exchange, and malleability, which limits reprocessing. Conventional thermoset polymers are therefore susceptible to failure after fracture or damage during service—thereby reducing their environmental sustainability, safety, and lifetime.

Dynamic covalent adaptive networks have been introduced in thermoset materials, in order to enhance repairability via dissociative and associative exchange pathways. In the case of a dissociative dynamic covalent adaptive network, there is a step-by-step breaking and reforming of bonds, resulting in a substantial change in the macromolecular structure. By contrast, an associative dynamic covalent adaptive network displays a relatively fixed crosslink density during bond exchange, i.e., during breaking and reforming of bonds. Associative dynamic covalent bond exchanges result in a minimal change in macromolecular structure, due to the fixed crosslink density.

An associative dynamic covalent adaptive network may be referred to as a "vitrimer" which has a vitreous silica-like behavior. Vitrimers are a class of polymer glasses with exceptional material properties, combining the malleability, repairability, and recyclability of thermoplastics with the strong mechanical performance of thermosets. The unique processability of vitrimers arises from the reversible bond-exchange mechanism, which allows covalent crosslinks in the polymer network to change dynamically while preserving the total number of bonds. In effect, crosslinked (or thermoset) vitrimers behave like viscoelastic liquids at high temperatures and as crosslinked thermosets at low temperatures.

Whereas thermoplastic materials and dissociative covalent adaptive networks change their topology gradually while heating above the glass-transition temperature $T_g$, vitrimers have a temperature-dependent viscoelastic behavior caused by the dynamic (covalent) bonds. The viscosity changes as a function of covalent exchange rate. Due to the controlled viscosity, vitrimers allow processing in a wide temperature range without loss in network integrity, whereas thermoplastic materials and dissociative covalent adaptive networks exhibit a significant drop in viscosity as well as crosslink density while increasing the temperature. Thermoplastic polymers have a transition from solid to rubbery conventionally described by $T_g$. The viscoelastic phase transitions in vitrimers is termed the topology freezing-point temperature, $T_v$. For example, $T_v$ can be chosen as the temperature where the vitrimer viscosity reaches $10^{12}$ Pa·s. See Krishnakumar et al., "Vitrimers: Associative dynamic covalent adaptive networks in thermoset polymers", *Chemical Engineering Journal* 385 (2020) 123820, which is hereby incorporated by reference.

The remarkable associative covalent adaptive network formation of vitrimers is suitable for a variety of fields, including electronics, adhesives, repairable composites, coatings, long-life structures, and transport and defense applications, for example.

Improved vitrimers, as well as methods of making and using the vitrimers, are still desired. In particular, there is a need for vitrimers that do not experience a significant reduction of mechanical properties at elevated temperatures and that are capable of being repaired after a period of use.

SUMMARY OF THE INVENTION

The present invention addresses the aforementioned needs in the art, as will now be summarized and then further described in detail below.

The disclosed technology provides improved thermoset vitrimers. It has been discovered that by incorporating adaptable dynamic groups along the polymer backbone, along with permanent, non-dynamic crosslinking points, an improved thermoset vitrimer is generated. In some variations, a thermoset vitrimer comprises: a linear polymer backbone containing associative dynamic covalently bonded species; a crosslinked network containing non-dynamic branch points; and non-dynamic species between non-dynamic branch points and terminal ends of the linear polymer backbone.

Some variations provide a thermoset vitrimer comprising:
a linear polymer backbone containing a plurality of associative dynamic covalently bonded species, wherein the linear polymer backbone has a first terminal end and a second terminal end;
a crosslinked network containing a first non-dynamic branch point and a second non-dynamic branch point, wherein the first non-dynamic branch point has a first branching functionality of at least 3;
a first non-dynamic species between the first non-dynamic branch point and the first terminal end of the linear polymer backbone; and
a second non-dynamic species between the second non-dynamic branch point and the second terminal end of the linear polymer backbone.

The linear polymer backbone is bonded to the first non-dynamic branch point and the second non-dynamic branch point, via the first non-dynamic species and the second non-dynamic species, respectively. See FIG. 1 for an exemplary illustration.

In some embodiments, the second non-dynamic branch point has a second branching functionality of at least 2. In certain embodiments, the second branching functionality is 3 or at least 3.

The first branching functionality $f_1$ may be the same as the second branching functionality $f_2$ (e.g., $f_1=f_2=3$). Alternatively, the first and second branching functionalities may be different (e.g., $f_1=3$ and $f_2=2$). In certain embodiments, the first branching functionality and/or the second branching functionality is at least 4. For example, in some embodiments, $f_1=3$ and $f_2=4$.

The thermoset vitrimer may comprise a plurality of first non-dynamic branch points and/or a plurality of second non-dynamic branch points. The number of first non-dynamic branch points may be the same as, or different than, the number of second non-dynamic branch points.

In some embodiments, the linear polymer backbone is characterized by a molecular distance between the first non-dynamic species and the second non-dynamic species of at least 100 g/mol. In certain embodiments, the molecular distance is at least 500 g/mol, such as at least 1000 g/mol.

In various embodiments, the associative dynamic covalently bonded species are selected from enamines including vinylogous urethanes and vinylogous ureas, photo-induced reversible addition—fragmentation chain-transfer polymerized products, silyl ether exchange reaction products, products from addition or elimination of silyloxy groups to silyl ethers, dioxaborolane metathesis products, products from reaction of polyesters with ester-adjacent hydroxyls, products of disulfide exchange, products from reaction of thioesters with free thiols, triazole transalkylation products, phosphate triesters, products of sulfonium-sulfide transalkylation, and combinations thereof. In some embodiments, the associative dynamic covalently bonded species are vinylogous urethanes and/or vinylogous ureas.

In some thermoset vitrimers, the linear polymer backbone contains from about 5 mol% to 100 mol% of associative dynamic covalently bonded species. In some embodiments, the linear polymer backbone contains at least 50 mol% of associative dynamic covalently bonded species. In certain embodiments, the linear polymer backbone contains at least 90 mol% of associative dynamic covalently bonded species.

The first non-dynamic species may be selected from the group consisting of ureas, urethanes, esters, amides, imides, oxalamides, epoxies, acrylates, and combinations thereof, for example. Independently, the second non-dynamic species may be selected from the group consisting of ureas, urethanes, esters, amides, imides, oxalamides, epoxies, acrylates, and combinations thereof, for example. The first non-dynamic species may be the same as the second non-dynamic species, or they may be different.

In some embodiments, the first non-dynamic species and the second non-dynamic species are each selected from ureas, urethanes, or a combination of ureas and urethanes. For example, the first non-dynamic species may be a urea species while the second non-dynamic species may be a urethane species.

In some embodiments, the first non-dynamic species and the second non-dynamic species are formed from trifunctional amine species and/or from trifunctional blocked amine species (e.g., imines). An exemplary trifunctional amine species is 4-(aminomethyl)octane-1,8-diamine. Likewise, an exemplary trifunctional blocked amine species is methyl isobutyl ketone (MIBK)-blocked 4-(aminomethyl)octane-1,8-diamine.

Other variations of the invention provide a method of making a thermoset vitrimer. Some methods comprise: reacting a linear prepolymer with an amine-containing species to form an amine-terminated linear prepolymer; reacting the amine-terminated linear prepolymer with an isocyanate-containing species to form an isocyanate-endcapped linear prepolymer; mixing the isocyanate-endcapped linear prepolymer with a reactive crosslinking agent having a crosslinking functionality of at least 3; and curing the isocyanate-endcapped linear prepolymer with the reactive crosslinking agent, thereby forming a thermoset vitrimer.

Some variations of the invention provide a method of making a thermoset vitrimer, the method comprising:
(a) preparing a linear prepolymer;
(b) reacting the linear prepolymer with an amine-containing species to form an amine-terminated linear prepolymer;
(c) reacting the amine-terminated linear prepolymer with an isocyanate-containing species to form an isocyanate-endcapped linear prepolymer;
(d) mixing the isocyanate-endcapped linear prepolymer with a reactive crosslinking agent having a crosslinking functionality of at least 3; and
(e) curing the isocyanate-endcapped linear prepolymer with the reactive crosslinking agent, thereby forming a thermoset vitrimer.

In some methods, the isocyanate-containing species acts as a polymer chain extender. The isocyanate-containing species may be a multifunctional isocyanate species, for example.

In some methods, the reactive crosslinking agent is a trifunctional amine species and/or a trifunctional blocked amine species. The trifunctional amine species may be 4-(aminomethyl)octane-1,8-diamine, for example. The trifunctional blocked amine species may be MIBK-blocked 4-(aminomethyl)octane-1,8-diamine, for example. A combination of blocked and unblocked trifunctional amine species may be employed.

In some methods, the linear prepolymer contains from about 5 mol% to 100 mol% of associative dynamic covalently bonded species. In certain methods, the linear prepolymer contains at least about 50 mol%, or at least about 90 mol%, of associative dynamic covalently bonded species.

Synthesis conditions in steps (a) to (d) may vary widely. Reaction steps may generally employ a reaction temperature from about 40° C. to about 180° C., a reaction time from about 1 minute to about 8 hours, and a reaction pressure from about 0.1 bar to about 5 bar, for example. Reactions may be catalyzed, such as with an acid catalyst. Mixing steps may generally employ a mixing temperature from about 40° C. to about 180° C., a mixing time from about 1 minute to about 1 hour, and a centrifugal mixing speed from about 200 revolutions per minute (rpm) to about 2000 rpm, for example. Reaction and mixing steps optionally employ one or more solvents, such as (but not limited to) methyl ethyl ketone, methyl n-propyl ketone, methyl isobutyl ketone, toluene, ethyl acetate, or butyl acetate.

Step (e) may include exposure to heat and humidity. In some embodiments, step (e) utilizes a curing temperature from about 40° C. to about 140° C. In some embodiments, step (e) utilizes a curing humidity from about 10% to 100%.

In certain methods, the isocyanate-endcapped linear prepolymer is applied to a surface prior to step (e). Optionally, the isocyanate-endcapped linear prepolymer is filmed or sprayed onto the surface. Filming may be accomplished using a doctor blade to a desired thickness, e.g. from about 10 μm to about 5000 μm, for example.

Some general methods of making a thermoset vitrimer comprise:
(a) preparing a reactive linear prepolymer;
(b) mixing the reactive linear prepolymer with a reactive crosslinking agent having a crosslinking functionality of at least 3; and
(c) curing the reactive linear prepolymer with the reactive crosslinking agent, thereby forming a thermoset vitrimer, wherein the thermoset vitrimer comprises:
a linear polymer backbone containing a plurality of associative dynamic covalently bonded species, wherein the linear polymer backbone has a first terminal end and a second terminal end;
a crosslinked network containing a first non-dynamic branch point and a second non-dynamic branch point, wherein the first non-dynamic branch point has a first branching functionality of at least 3;
a first non-dynamic species between the first non-dynamic branch point and the first terminal end of the linear polymer backbone; and
a second non-dynamic species between the second non-dynamic branch point and the second terminal end of the linear polymer backbone.

Some general methods employ one or more reactive end groups selected from the group consisting of amines, alcohols, epoxies, esters, thioesters, triazoles, sulfides, dioxaborolanes, and phosphate triesters. In preferred methods, amines and/or alcohols are utilized as reactive end groups.

The general method may utilize a chemical reaction selected from the group consisting of photo-induced reversible addition—fragmentation chain transfer, formation of enamines, formation of vinylogous urethanes, formation of vinylogous ureas, silyl ether exchange reactions, addition and/or elimination of silyloxy groups to or from silyl ethers, dioxaborolane metathesis, addition of polyesters to ester-adjacent hydroxyls, disulfide exchange, addition of thioesters to free thiols, transalkylation of triazoles, formation of phosphate triester, sulfonium-sulfide transalkylation, and combinations thereof.

Experimentally produced thermoset vitrimers demonstrate the ability for self-repair at elevated temperature, as shown in Example 6.

DETAILED DESCRIPTION OF EMBODIMENTS OF THE INVENTION

The principles, structures, compositions, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

Unless otherwise stated, all molecular weights herein are number-average molecular weights, $M_n$.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

Variations of the present invention provide thermoset vitrimers having internal dynamic bonds within the polymer backbone of a crosslinked thermoset (network). The disclosed technology is distinct from the prior art. In this disclosure, the associative dynamic covalent bonds are internal in the polymer backbone and are crosslinked with non-dynamic bonds. This contrasts with conventional art in which the polymer backbone incorporates only non-dynamic bonds, and the network is crosslinked with dynamic branch points.

In this disclosure a "polymer" means a large molecule, or macromolecule, composed of at least two repeat subunits. The number of repeat subunits may be in principle any number greater than 2, but typically is limited to about 10,000. In various embodiments, the number of repeat subunits (also known as the degree of polymerization) is 2, 3, 4, 5, 6, 7, 8, 9, about 10, about 50, about 100, about 200, about 500, about 1,000, about 2,000, or about 5,000.

In this specification, "dynamic bonding", "dynamic bonds", and the like refer to bonds which can undergo crosslink exchange through one-step exchange reactions. Bond breakage and reformation occur at essentially equal rates with transient presence of an intermediate. A "dynamic species" or equivalently a "dynamic-bonded species" is a species that contains at least one dynamic bond. "Non-dynamic bonding", "non-dynamic bonds", and the like refer to bonds which can undergo crosslink exchange only through multiple-step reactions. Bond breakage and reformation generally occur at different rates and there is significant presence of one or more intermediates. A "non-dynamic species" or equivalently a "non-dynamic-bonded species" is a species that contains no dynamic bonds. See Jin et al., "Malleable and Recyclable Thermosets: The Next Generation of Plastics", *Matter* 1, 1456-1493, Dec. 4, 2019, which is hereby incorporated by reference.

The disclosure is predicated, at least in part, on specific placement of dynamic species and non-dynamic species in the thermoset matrix. Conventionally, adaptable thermosets are made using dynamic (vitrimer) bonds at the crosslinking points. At elevated temperature, those dynamic bonds undergo dynamic rearrangement which results in a significant reduction of mechanical performance. The present inventors have discovered that by incorporating adaptable dynamic groups along the polymer backbone, along with permanent, non-dynamic crosslinking points, an improved thermoset vitrimer is generated. At elevated temperatures, the permanent non-dynamic crosslinking points act to constrain material flow during dynamic rearrangement. This constraint results in a material that is reweldable, rebondable, and/or repairable upon activation of the dynamic bonds—yet maintains integrity of the material properties.

The present invention provides crosslinked (thermoset) materials which can adapt to applied stresses while maintaining bond conservation. These dynamic bonds include, but are not limited to, associative exchange, concerted rearrangements, and dynamic covalent exchange. Some examples include photo-induced RAFT, enamines, silyl ether exchange reactions, addition/elimination of silyloxy groups to silyl ethers, double dioxaborolane metathesis, polyesters+ester-adjacent hydroxyls, disulfide exchange, thioesters+free thiols, transalkylation of triazoles, and sulfonium-sulfide transalkylation.

See Zou et al., "Dynamic Covalent Polymer Networks: from Old Chemistry to Modern Day Innovations", *Advanced Materials* 2017, 29 (14), 1606100 and Winne et al., "Dynamic covalent chemistry in polymer networks: a mechanistic perspective", *Polymer Chemistry* 2019, 10 (45), 6091-6108, each of which is hereby incorporated by reference for types of dynamic bonds and dynamic species that may be employed in the present disclosure.

As an exemplary composition, without limiting the present invention, polyurea thermosets containing vinylogous urethane bonds (dynamic) within the polymer backbone become malleable after activation by external stimuli (e.g. heat and/or pressure) to form a dynamically reworkable covalent network. Isocyanate-terminated oligomers containing internal vinylogous urethane groups and blocked amine crosslinkers contribute to a thermoset resin capable of extending part lifetime and performance needs in various applications. Control over the number of dynamic groups in the polymer is primarily dictated by stoichiometry of the starting components for synthesis.

The present invention also provides synthesis and formulation methods to alter the dynamic bond content within a network. The disclosed vitrimers enable rebonding, repair, and rearrangement, which improves upon traditional thermosets that are infusible after crosslinking, have no or limited reworkability, and undergo reduction in material performance and longevity after external stimuli such as heat. The disclosed vitrimeric thermosets exhibit traditional thermoset-like behavior at ambient conditions, yet gain malleability after activation by an external stimulus due to dynamic bond interactions.

Incorporating the vitrimer (associative dynamic covalent) bonds along the polymer backbone results in sustained mechanical properties and constrained flow during dynamic rearrangement. This placement of associative dynamic covalent bonds is an improvement compared to vitrimers with the majority of dynamic bonds at the crosslinking points. The positioning of the dynamic groups within the polymer backbone rather than at crosslinking points is an important distinction over the prior art. Additionally, by keeping the associative dynamic covalent bonds primarily or exclusively in the polymer backbone, the present invention can provide more control over the number of dynamic groups within the thermoset material.

Most reported vitrimers contain high catalyst loadings to allow for dynamic-covalent rearrangement (e.g., epoxy/anhydride, polyurethane, or polyurea) with external stimuli or have the majority of the overall network comprised of dynamic-covalent bonds (e.g., imine, vinylogous urethane, disulfide, or dioxaborolane). While these methods can result in polymers with vitrimeric properties, the catalysts are generally toxic and expensive; also, high catalyst loading can potentially degrade material properties. Additionally, if the majority (or all) of the thermoset structure contains dynamic connections, properties such as creep begin to suffer. By contrast, incorporating oligomers or polymers containing associative dynamic bonds within the polymer backbone, and employing non-dynamic crosslinking at network branch points to create the final thermoset network, breaks the trade-off and provides a new material with both traditional and vitrimer (adaptable) thermoset properties. Synthesis of a wide range of thermoset architectures is enabled by this disclosure. Thermoset repairing, rewelding, and/or rebonding may be used to improve fatigue lifetime and overall longevity.

Some variations provide a thermoset vitrimer comprising:

a linear polymer backbone containing a plurality of associative dynamic covalently bonded species, wherein the linear polymer backbone has a first terminal end and a second terminal end;

a crosslinked network containing a first non-dynamic branch point and a second non-dynamic branch point, wherein the first non-dynamic branch point has a first branching functionality of at least 3;

a first non-dynamic species between the first non-dynamic branch point and the first terminal end of the linear polymer backbone; and a second non-dynamic species between the second non-dynamic branch point and the second terminal end of the linear polymer backbone.

The linear polymer backbone is bonded to the first non-dynamic branch point and the second non-dynamic branch point, via the first non-dynamic species and the second non-dynamic species, respectively.

Figure 1:
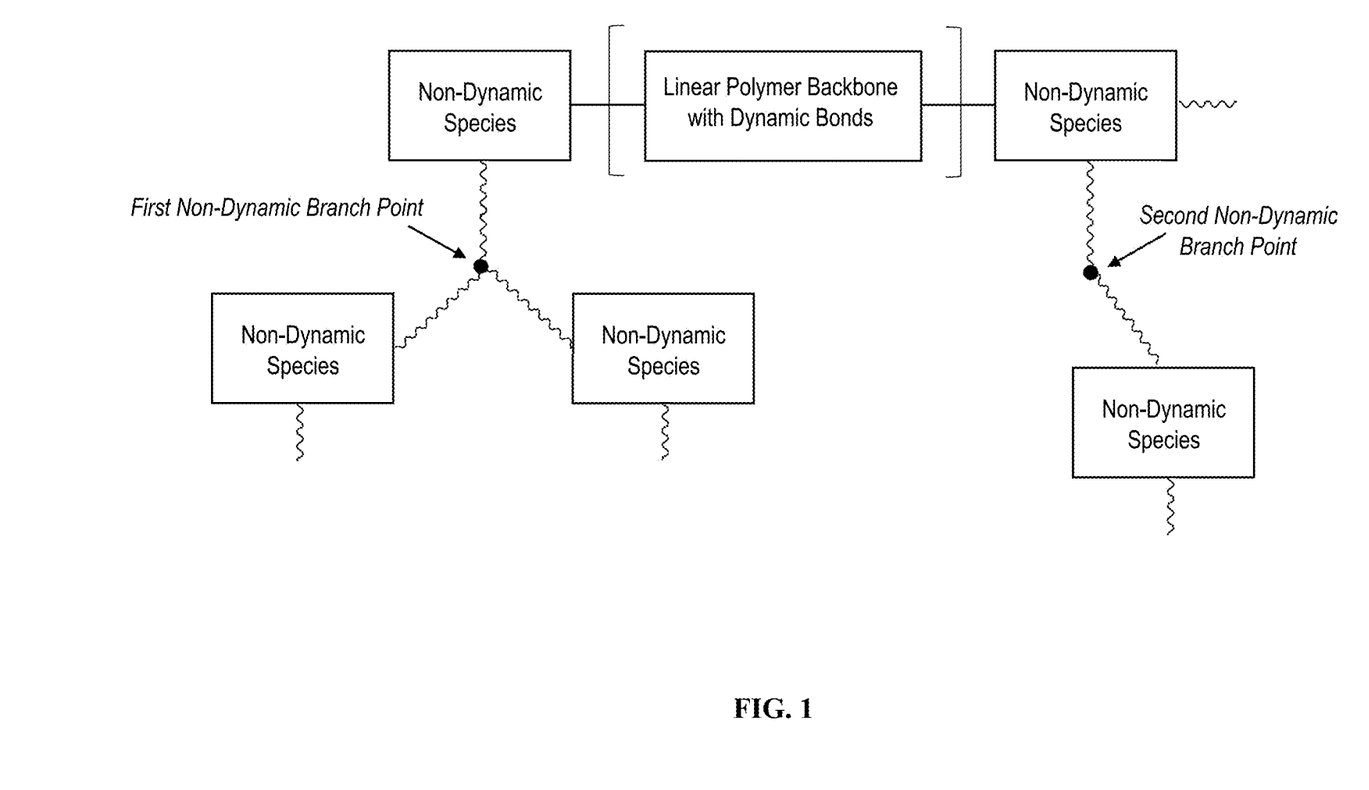
FIG. 1 depicts an illustration of an exemplary thermoset vitrimer provided in this disclosure.

FIG. 1 is an illustration of an exemplary thermoset vitrimer provided in this disclosure. The adaptable thermoset network includes a linear polymer backbone with dynamic bonds. Outside of the polymer backbone, there are multiple non-dynamic species that form a crosslinked network at multiple branch points, including at least a first non-dynamic branch point and a second non-dynamic branch point.

A "non-dynamic branch point" is a branch point that is connected to only non-dynamic species with non-dynamic bonds. In conventional adaptable thermoset polymers, the crosslinked network utilizes solely dynamic bonding at the branch points.

In FIG. 1, the polymer backbone includes a plurality of associative dynamic covalently bonded species, which means at least 2 of such dynamic species. Typically there are many of such dynamic species, depending on molecular weight of the polymer backbone. The dynamic bonds may be in the polymer backbone along the main chain, in side chains attached to the main chain of the polymer, or a combination thereof. The polymer backbone contains at least some dynamic bonds and may also include some non-dynamic bonds.

In FIG. 1, the polymer backbone is a linear polymer backbone. It will be recognized that the overall polymer network is not usually linear, and may be branched, cyclic, or random in a crosslinked network. The overall thermoset vitrimer of FIG. 1 is not linear. The thermoset vitrimer will contain at least one linear polymer backbone that is bonded to two non-dynamic branch points.

In an overall thermoset vitrimer, it is preferred that all linear polymer backbones are bonded only to non-dynamic species, and that all branch points are connected only to non-dynamic species. Notwithstanding this preference, one or more dynamic branch points may be present within a network that also includes a plurality of non-dynamic branch points. A "dynamic branch point" is a branch point that is connected to at least one dynamic species with a dynamic bond. It is preferred that of all branch points in the thermoset vitrimer, at least 50%, more preferably at least 75%, and most preferably at least 80%, 85%, 90%, 95%, 99%, or 100% of the branch points are non-dynamic branch points.

A "fully dynamic branch point" is a branch point that is connected solely to dynamic species with dynamic bonds. It is preferred that there are no fully dynamic branch points in the thermoset vitrimer. In some embodiments, there is less than 10%, 5%, 4%, 3%, 2%, 1%, 0.5%, 0.1%, or 0% fully dynamic branch points as a percentage of all branch points in the thermoset vitrimer.

In some embodiments, the second non-dynamic branch point has a second branching functionality of at least 2. In certain embodiments, the second branching functionality is 3 or at least 3.

The first branching functionality $f_1$ may be the same as the second branching functionality $f_2$ (e.g., $f_1=f_2=3$). Alternatively, the first and second branching functionalities may be different (e.g., $f_1=3$ and $f_2=2$). In certain embodiments, the first branching functionality and/or the second branching functionality is at least 4. For example, in some embodiments, $f_1=3$ and $f_2=4$.

The thermoset vitrimer may comprise a plurality of first non-dynamic branch points and/or a plurality of second non-dynamic branch points. The number of first non-dynamic branch points may be the same as, or different than, the number of second non-dynamic branch points.

In some embodiments, the linear polymer backbone is characterized by a molecular distance between the first non-dynamic species and the second non-dynamic species of at least 100 g/mol. In certain embodiments, the molecular distance is at least 500 g/mol, such as at least 1000 g/mol. In various embodiments, the molecular distance between the first non-dynamic species and the second non-dynamic species is about, at least about, or at most about 100, 200, 300, 400, 500, 1000, or 2000 g/mol, including all intervening ranges. With reference to FIG. 1, the first non-dynamic species may be on the left-hand side of the polymer backbone, and the second non-dynamic species may be on the right-hand side of the polymer backbone.

In various embodiments, the associative dynamic covalently bonded species are selected from enamines including vinylogous urethanes and vinylogous ureas, photo-induced reversible addition—fragmentation chain-transfer polymerized products, silyl ether exchange reaction products, products from addition or elimination of silyloxy groups to silyl ethers, dioxaborolane metathesis products, products from reaction of polyesters with ester-adjacent hydroxyls, products of disulfide exchange, products from reaction of thioesters with free thiols, triazole transalkylation products, phosphate triesters, products of sulfonium-sulfide transalkylation, and combinations thereof. In some embodiments, the associative dynamic covalently bonded species are vinylogous urethanes and/or vinylogous ureas.

In some thermoset vitrimers, the linear polymer backbone contains from about 5 mol% to 100 mol% of associative dynamic covalently bonded species. In some embodiments, the linear polymer backbone contains at least 50 mol% of associative dynamic covalently bonded species. In certain embodiments, the linear polymer backbone contains at least 90 mol% of associative dynamic covalently bonded species. In various embodiments, the linear polymer backbone contains about, or at least about 5, 10, 15, 20, 25, 30, 35, 40, 50, 60, 70, 80, 85, 90, 95, or 99 mol% of associative dynamic covalently bonded species.

The first non-dynamic species may be selected from the group consisting of ureas, urethanes, esters, amides, imides, oxalamides, epoxies, acrylates, and combinations thereof, for example. Independently, the second non-dynamic species may be selected from the group consisting of ureas, urethanes, esters, amides, imides, oxalamides, epoxies, acrylates, and combinations thereof, for example. The first non-dynamic species may be the same as the second non-dynamic species, or they may be different.

In some embodiments, the first non-dynamic species and the second non-dynamic species are each selected from ureas, urethanes, or a combination of ureas and urethanes.

Note that in a typical crosslinked network, there is a plurality of first non-dynamic species and a plurality of second non-dynamic species, as depicted in FIG. 1. Also, there is generally a plurality of first non-dynamic branch points and/or a plurality of second non-dynamic branch points. Only one of each type of branch point is shown in FIG. 1 for purposes of illustration.

In some embodiments, the crosslinked network is a non-dynamic polyurea crosslinked thermoset. In some embodiments, the crosslinked network is a non-dynamic polyurethane crosslinked thermoset. In certain embodiments, the crosslinked network is a non-dynamic polyurea/polyurethane crosslinked thermoset.

In some embodiments, the first non-dynamic species and the second non-dynamic species are formed from trifunctional amine species and/or from trifunctional blocked amine species (e.g., imines). An exemplary trifunctional amine species is 4-(aminomethyl)octane-1,8-diamine. Likewise, an exemplary trifunctional blocked amine species is MIBK-blocked 4-(aminomethyl)octane-1,8-diamine. MIBK is methyl isobutyl ketone.

Optionally, a vitrimer catalyst may be included in the thermoset vitrimer. A vitrimer catalyst may enhance the dynamic (vitrimer) properties during use of the thermoset vitrimer. A vitrimer catalyst may function as a catalyst for a reaction during synthesis of the thermoset vitrimer and then remain in the composition for enhancing dynamic properties. Alternatively, or additionally, a vitrimer catalyst added during synthesis may be inert with respect to chemical reactions during synthesis but catalytically active for enhancing dynamic properties of the thermoset vitrimer at a later time. In some embodiments, the vitrimer catalyst is an acid catalyst, such as a Brønsted acid. Examples of Brønsted acid catalysts include, but are not limited to, para-toluenesulfonic acid, acetic acid, nitrous acid, and hydrochloric acid.

In some embodiments, filler particles are incorporated into the thermoset vitrimer, such as to improve mechanical properties. Filler particles may be selected from the group consisting of toughening particles (e.g., polypropylene, polyethylene, or an ethylene-propylene copolymer), transparency-modifying particles, refractive index-modifying particles (e.g., high-refractive-index nanoparticles), flame-retardant particles, and combinations thereof. In some embodiments, the filler particles are selected from the group consisting of Ge, $CaF_2$, NaCl, KCl, KBr, diamond, Si, CsI, MgO, $MgF_2$, LiF, NaF, $BaF_2$, ZnS, ZnSe, PbS, PbSe, $PbF_2$, $LiYF_4$, $NaYF_4$, ThBrI, ThBrCl, Si, SiC, Ge, GaAs, AlN, AlON, $Al_2O_3$, polyethylene, polypropylene, and combinations thereof. Multiple types of filler particles may be present. Other additives may be present in the thermoset vitrimer, such as inorganic pigments, for example.

In certain embodiments, the filler particles are high-refractive-index nanoparticles selected from the group consisting of titanium dioxide, silicon, germanium, zinc oxide, silicon carbide, silicon dioxide, hafnium oxide, zinc selenide, zinc sulfide, sapphire, calcium fluoride, sodium fluoride, lithium fluoride, cesium fluoride, cesium bromide, potassium bromide, potassium iodide, and combinations thereof.

The filler particles may vary widely in particle size. In some embodiments, the filler particles have an average particle size from about 5 nanometers to about 100 microns, such as from about 10 nanometers to about 10 microns. The average particle size is the average diameter in the case of spherical particles and the average effective diameter in the case of non-spherical particles.

In this disclosure, particles sizes may be measured by a variety of techniques, including dynamic light scattering, laser diffraction, image analysis, or sieve separation, for example. Dynamic light scattering is a non-invasive, well-established technique for measuring the size and size distribution of particles typically in the submicron region, and with the latest technology down to 1 nanometer. Dynamic light scattering is a widely used particle-sizing technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate particle sizes and distributions can be done directly on photomicrographs, scanning electron micrographs, or other images.

The filler particles may be in the form of spheres, rods, whiskers, platelets, or a combination thereof, for example. The filler particles may have a spherical geometry or they may have a geometric aspect ratio greater than 1 along one or more Cartesian axes (e.g. rods, whiskers, or platelets).

In some embodiments, the filler particles (when present) have an average volumetric loading from about 1 vol% to about 10 vol% based on volume of the thermoset vitrimer plus volume of the filler particles, for example. In various embodiments, the average volumetric loading of the filler particles is about, or at most about 0.1, 0.5, 1, 2, 3, 4, 5, 10, 15, 20, or 25 vol%.

The filler particles (when present) may be selected based upon their ability to toughen the underlying polymer matrix by means of crack tip blunting (reduced stress intensity factor), crack tip deflection (increased crack path length), or formation of local elastic heterogeneities that impose a residual compressive stress state around the fillers, or for other reasons, for example.

Other variations of the invention provide a method of making a thermoset vitrimer, the method comprising:
(a) preparing a linear prepolymer;
(b) reacting the linear prepolymer with an amine-containing species to form an amine-terminated linear prepolymer;
(c) reacting the amine-terminated linear prepolymer with an isocyanate-containing species to form an isocyanate-endcapped linear prepolymer;
(d) mixing the isocyanate-endcapped linear prepolymer with a reactive crosslinking agent having a crosslinking functionality of at least 3; and
(e) curing the isocyanate-endcapped linear prepolymer with the reactive crosslinking agent, thereby forming a thermoset vitrimer.

Figure 2:
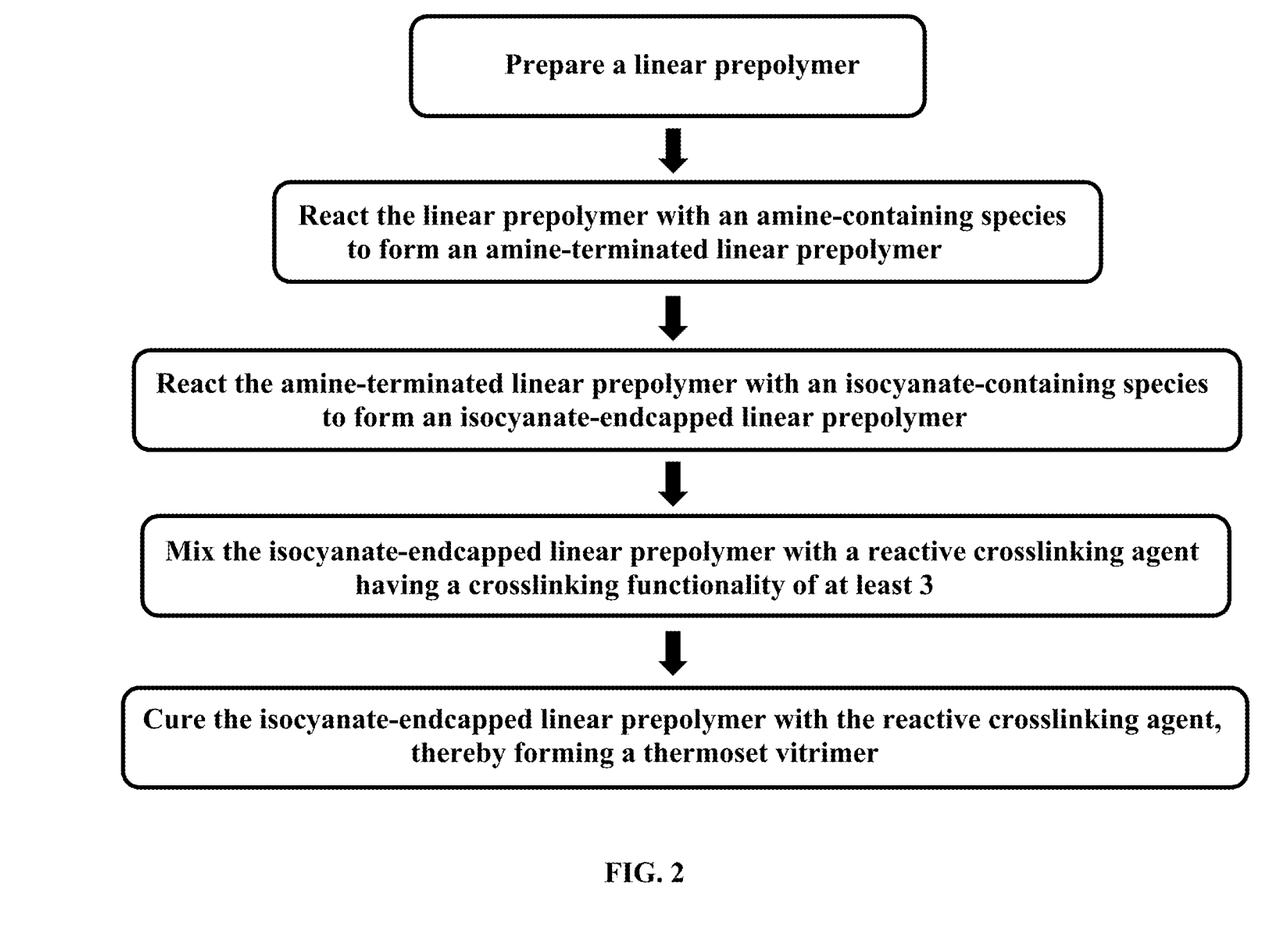
FIG. 2 depicts an exemplary flowchart of a synthesis method to prepare a thermoset vitrimer, in some embodiments.

FIG. 2 depicts an exemplary flowchart of a synthesis method to prepare a thermoset vitrimer, in some embodiments.

The isocyanate-containing species may be a multifunctional isocyanate species, for example. In some methods, the isocyanate-containing species acts as a polymer chain extender.

In some methods, the reactive crosslinking agent is a trifunctional amine species and/or a trifunctional blocked amine species. The trifunctional amine species may be 4-(aminomethyl)octane-1,8-diamine, for example. The trifunctional blocked amine species may be MIBK-blocked 4-(aminomethyl)octane-1,8-diamine, for example. A combination of blocked and unblocked trifunctional amine species may be employed.

The reactive crosslinking agent may be selected from the group consisting of 4-(aminomethyl)octane-1,8-diamine, 3-(aminomethyl)octane-1,8-diamine, 2-(aminomethyl)octane-1,8-diamine, 1-(aminomethyl)octane-1,8-diamine, tetraethylenetriamine, tetraethylenetetramine, tetraethylenepentamine, N-(hydroxyethyl)diethylenetriamine, chemical analogues thereof, and combinations of the foregoing.

In some methods, the linear prepolymer contains from about 5 mol% to 100 mol% of associative dynamic covalently bonded species. In certain methods, the linear prepolymer contains at least about 50 mol%, or at least about 90 mol%, of associative dynamic covalently bonded species. In various methods, the linear prepolymer contains about, or at least about 5, 10, 15, 20, 25, 30, 35, 40, 50, 60, 70, 80, 85, 90, 95, or 99 mol% of associative dynamic covalently bonded species.

Synthesis conditions in steps (a) to (d) may vary widely, as will be appreciated by a person skilled in chemistry.

Reaction steps may generally employ a reaction temperature from about 40° C. to about 180° C., a reaction time from about 1 minute to about 8 hours, and a reaction pressure from about 0.1 bar to about 5 bar, for example. Reactions may be catalyzed, such as with an acid catalyst or another type of catalyst.

Mixing steps may generally employ a mixing temperature from about 40° C. to about 180° C., and a mixing time from about 1 minute to about 1 hour. Mixing may be achieved using mechanical agitation with an internal impeller, sonication, solvent recirculation, vessel rotation, or other means of agitation. When an internal impeller is utilized, the centrifugal mixing speed may be from about 200 revolutions per minute (rpm) to about 2000 rpm, for example.

Reaction and mixing steps optionally employ one or more solvents, such as (but not limited to) methyl ethyl ketone, methyl n-propyl ketone, methyl isobutyl ketone, toluene, ethyl acetate, or butyl acetate.

Step (e) may include exposure to heat and humidity. In some embodiments, step (e) utilizes a curing temperature from about 40° C. to about 140° C. In some embodiments, step (e) utilizes a curing humidity from about 10% to 100%. Step (e) may employ a curing time from about 5 minutes to about 10 hours, such as from about 30 minutes to about 2 hours, for example.

In certain methods, the isocyanate-endcapped linear prepolymer is applied to a surface prior to step (e). Optionally, the isocyanate-endcapped linear prepolymer is filmed or sprayed onto the surface. Filming may be performed using a doctor blade to a desired thickness, such as from about 10 µm to about 5000 µm, for example.

Some general methods of making a thermoset vitrimer comprise:
(a) preparing a reactive linear prepolymer;
(b) mixing the reactive linear prepolymer with a reactive crosslinking agent having a crosslinking functionality of at least 3; and
(c) curing the reactive linear prepolymer with the reactive crosslinking agent, thereby forming a thermoset vitrimer, wherein the thermoset vitrimer comprises:
a linear polymer backbone containing a plurality of associative dynamic covalently bonded species, wherein the linear polymer backbone has a first terminal end and a second terminal end;
a crosslinked network containing a first non-dynamic branch point and a second non-dynamic branch point, wherein the first non-dynamic branch point has a first branching functionality of at least 3;
a first non-dynamic species between the first non-dynamic branch point and the first terminal end of the linear polymer backbone; and
a second non-dynamic species between the second non-dynamic branch point and the second terminal end of the linear polymer backbone.

The reactive linear prepolymer contains reactive end groups. In polymer chemistry, end groups are functionalities or constitutional units that are at the extremity of a macromolecule or oligomer. Reactive end groups may be selected from the group consisting of amines, alcohols, epoxies, esters, thioesters, triazoles, sulfides, dioxaborolanes, and phosphate triesters. In preferred methods, amines and/or alcohols are utilized as reactive end groups. For example, in FIG. 3, amines are employed as reactive end groups.

The general method of making a thermoset vitrimer may utilize a chemical reaction selected from the group consisting of photo-induced reversible addition—fragmentation chain transfer, formation of enamines, formation of vinylogous urethanes, formation of vinylogous ureas, silyl ether exchange reactions, addition and/or elimination of silyloxy groups to or from silyl ethers, dioxaborolane metathesis, addition of polyesters to ester-adjacent hydroxyls, disulfide exchange, addition of thioesters to free thiols, transalkylation of triazoles, formation of phosphate triester, sulfonium-sulfide transalkylation, and combinations thereof.

Synthesis conditions in steps (a) to (c) may vary widely for the general method of making a thermoset vitrimer.

Reaction steps may generally employ a reaction temperature from about 40° C. to about 180° C., a reaction time from about 1 minute to about 8 hours, and a reaction pressure from about 0.1 bar to about 5 bar, for example. Reactions may be catalyzed, such as with an acid catalyst or another type of catalyst.

Mixing steps may generally employ a mixing temperature from about 40° C. to about 180° C., and a mixing time from about 1 minute to about 1 hour. Mixing may be achieved using mechanical agitation with an internal impeller, sonication, solvent recirculation, vessel rotation, or other means of agitation. When an internal impeller is utilized, the centrifugal mixing speed may be from about 200 revolutions per minute (rpm) to about 2000 rpm, for example.

Reaction and mixing steps optionally employ one or more solvents, such as (but not limited to) methyl ethyl ketone, methyl n-propyl ketone, methyl isobutyl ketone, toluene, ethyl acetate, or butyl acetate.

In some methods, effective prepolymerization conditions in step (a) include a temperature selected from about 10° C. to about 100° C. In certain methods, the prepolymerization temperature is selected from about 15° C. to about 50° C., such as from about 20° C. to about 30° C. Mixing, such as centrifugal mixing, may be employed to assist the prepolymerization reaction(s).

In some methods, effective polymerization conditions in steps (b) and/or (c) include a temperature selected from about 10° C. to about 100° C. In certain methods, the polymerization temperature is selected from about 15° C. to about 50° C., such as from about 20° C. to about 30° C. Mixing, such as centrifugal mixing, may be employed to assist the polymerization reaction(s).

Step (c) may include exposure to heat and humidity. In some embodiments, step (e) utilizes a curing temperature from about 40° C. to about 140° C. In some embodiments, step (c) utilizes a curing humidity from about 10% to 100%. Step (c) may employ a curing time from about 5 minutes to about 10 hours, such as from about 30 minutes to about 2 hours, for example.

The method may further comprise adding filler particles in a solvent to a prepolymer, thereby creating a mixture; casting, spraying, spinning, or dip-coating a film of the mixture; and curing the film to form the thermoset vitrimer, along with solvent removal before or after curing. Solvent removal may be accomplished by heating, evaporation, vacuum, or a combination thereof, for example. In some embodiments, the solvent is selected from the group consisting of toluene, xylenes, ethanol, butanol, tetrahydrofuran, methyl ethyl ketone, methyl isobutyl ketone, and combinations thereof. "Xylenes" include m-xylene, o-xylene, and p-xylene.

In some methods, filler particles are combined with a starting thermoset vitrimer, thereby creating a mixture. The mixture may then be cast or pressed into a mold to fabricate the final thermoset vitrimer. The filler particles may be selected from the group consisting of toughening particles, transparency-modifying particles, refractive index-modifying particles, flame-retardant particles, and combinations thereof.

Exemplary methods of use will now be further described. After being prepared, and when the thermoset vitrimer needs to be repaired, or for preventative treatment, the thermoset vitrimer may be subjected to an elevated temperature for purposes of breaking and (re)forming bonds. An elevated temperature causes rearrangement of dynamic bonds in the polymer backbone, but preferably retains the permanent non-dynamic branch (crosslink) points to constrain material flow. The process of rearranging dynamic bonds in the polymer backbone allows the processing of the thermoset vitrimer in a manner that maintains or improves one or more properties. Those properties are typically mechanical properties (e.g., compressive strength) but could alternatively, or additionally, be chemical, thermal, electrical, or magnetic properties, for example. The process of rearranging dynamic bonds may be referred to as repairing, healing, reworking, rebonding, and/or rearranging the thermoset vitrimer. Such processing can even remove defects, analogous to how classical materials such as metals can be (re)processed.

The relaxation dynamics of vitrimers are characterized by two distinct transition temperatures: the conventional glass-transition temperature $T_g$ and a topology-freezing transition temperature $T_v$ at which the bond-switching rate (for rearrangement of dynamic bonds) becomes immeasurably slow. $T_g$ is the usual temperature of transition between the glassy and rubbery state of a polymer network, correlated to the onset of long-range, coordinated molecular motion. $T_v$ is a transition temperature that depends on the network crosslink exchange reactions. When the time scale of bond-exchange reactions becomes shorter than the time scale of material deformation, the network can rearrange its topology, resulting in flow. Hence, a transition from viscoelastic solid to viscoelastic liquid occurs at $T_v$. The topology-freezing transition may be the temperature corresponding to a viscosity of $10^{12}$ Pa·s. $T_v$ may also be observed experimentally by dilatometry, since a reorganizing network has a higher expansion coefficient than a static network. See Yang et al., "Detecting topology freezing transition temperature of vitrimers by AIE luminogens", *NATURE COMMUNICATIONS* 10:3165 (2019), which is hereby incorporated by reference for measurement and estimation of $T_v$ for vitrimers, in some embodiments.

$T_v$ may be controlled independently from $T_g$, by tuning the concentration of catalyst for the exchange reaction, for example. Alternatively, or additionally, $T_g$ and $T_v$ may be controlled by adjusting parameters such as the crosslink density, intrinsic rigidity of monomers, and/or the density of exchangeable bonds and groups. For most applications, vitrimers preferably behave like classical thermosetting polymer networks in a useful temperature window, i.e. without significant creep. Only when heated, the network reorganization becomes significant, resulting in a controlled macroscopic flow without risking structural damage.

$T_v$ may be lower than, higher than, or about the same as $T_g$, in various embodiments. When $T_g < T_v$, upon heating from a temperature below $T_g$ to a temperature between $T_g$ and $T_v$, the glassy solid will first undergo a transition to the rubbery state and will behave as an elastomer since the exchange reactions are so slow that the network structure is essentially fixed. On further heating, the exchange reactions speed up and become relevant at temperatures above $T_v$, transforming the vitrimer to a viscoelastic liquid with flow mainly controlled by the crosslink exchange kinetics, and typically with typical Arrhenius-law viscosity decrease. When $T_g > T_v$, intrinsically fast exchange reactions are embedded in a rigid polymer matrix, and upon heating, the vitrimer undergoes a topology-freezing transition before a glass transition. The network is not necessarily frozen by the reaction kinetics, but by the lack of segmental motions associated with $T_g$. At temperatures below $T_g$, no segmental motion occurs; consequently, no exchange reactions can occur and the network is diffusion-controlled. Upon heating above $T_g$, segmental motion is gradually initiated while the exchange reactions are already fast (in cases for which $T_g > T_v$). Network rearrangement kinetics are diffusion-controlled and network topology rearrangements are dominated by segmental motions, resulting in Williams-Landel-Ferry viscosity behavior. With further heating, the exchange kinetics transition from a diffusion-controlled regime to an exchange reaction-controlled regime, which then follows the Arrhenius law. When $T_g = T_v$ (or $T_g \approx T_v$), the situation is intermediate between the two cases described in this paragraph. In particular, the vitrimer undergoes both a glass transition along with a topology-freezing transition, generating a viscoelastic liquid with flow mainly controlled by the crosslink exchange kinetics in an exchange reaction-controlled regime.

The $T_g$ of the thermoset vitrimer may vary, such as from about 0° C. to about 200° C. In some embodiments, $T_g$ is less than room temperature (25° C.). In other embodiments, $T_g$ is room temperature or greater. In various embodiments, $T_g$ is about, at least about, or at most about 0° C., 10° C., 20° C., 25° C., 30° C., 40° C., 50° C., 60° C., 70° C., 80° C., 90° C., 100° C., 110° C., 120° C., 130° C., 140° C., 150° C., 160° C., 170° C., 180° C., 190° C., or 200° C., including any intervening ranges.

The $T_v$ of the thermoset vitrimer may vary, such as from about 25° C. to about 250° C. In some embodiments, $T_v$ is about 50° C. or greater, such as about 100° C. or greater. In various embodiments, $T_v$ is about, at least about, or at most about 20° C., 25° C., 30° C., 40° C., 50° C., 60° C., 70° C., 80° C., 90° C., 100° C., 110° C., 120° C., 130° C., 140° C., 150° C., 160° C., 170° C., 180° C., 190° C., 200° C., 210° C., 220° C., 230° C., 240° C., or 250° C., including any intervening ranges.

The difference between topology-freezing transition temperature and glass-transition temperature ($T_v$-$T_g$) of the thermoset vitrimer may vary, such as from about 25 to about 100 degrees Celsius. In various embodiments, the difference ($T_v$-$T_g$) is about, at least about, or at most about −50, −40, −30, −25, −20, −15, −10, −5, 0, 5, 10, 15, 20, 25, 30, 40, 50, 60, 70, 80, 90, or 100 degrees Celsius, including any intervening ranges.

When $T_v > T_g$, the temperature at which the thermoset vitrimer is processed for repair is preferably at least $T_v$. The repair temperature may exceed $T_v$ by about 2, 5, 10, 15, 20, 25, 30, 40, 50 degrees Celsius, or more, for example. In one example, $T_v$ is about 100° C. and the repair temperature is about 120° C.

When $T_v < T_g$, the temperature at which the thermoset vitrimer is processed for repair is preferably at least $T_v$, more preferably between $T_v$ and $T_g$, and most preferably at least $T_g$, for the specific thermoset vitrimer. The repair temperature may exceed $T_v$ by about 10, 20, 30, 40, 50, 60, 70, 80, 90, or 100 degrees Celsius, or more, for example. The repair temperature may exceed $T_g$ by about 2, 5, 10, 20, 30, 40, or 50 degrees Celsius, or more, for example.

In some embodiments, the repair temperature is about 50° C. or greater, such as about 100° C. or greater. In various embodiments, the repair temperature is about, at least about, or at most about 50° C., 60° C., 70° C., 80° C., 90° C., 100° C., 110° C., 120° C., 130° C., 140° C., 150° C., 160° C., 170° C., 180° C., 190° C., or 200° C., including any intervening ranges (e.g., a repair temperature of about 100-120° C.). Multiple repair temperatures may be utilized, such as in a thermal ramp for healing the thermoset vitrimer, allowing for sufficient repair time at each selected healing temperature.

The "repair time" is the time for which the thermoset vitrimer is held at a given temperature in order to return the vitrimer back to an initial state and/or to a predetermined state. For example, the predetermined state may be 50%, 90%, or 100% of the original compressive strength of the thermoset vitrimer. The repair time will generally be dictated by the repair temperature for a given thermoset vitrimer (and its concentration of vitrimer catalyst, if any). In some embodiments, the repair time is from about 10 seconds to about 10 minutes. In certain embodiments, the repair time is from about 30 seconds to about 5 minutes. In various embodiments, the repair time is about, at least about, or at most about 5 seconds, 10 seconds, 20 seconds, 30 seconds, 1 minute, 2 minutes, 3 minutes, 4 minutes, 5 minutes, 6 minutes, 7 minutes, 8 minutes, 9 minutes, 10 minutes, 15 minutes, 20 minutes, or 30 minutes, including any intervening ranges. As noted above, when a thermal ramp is employed, each repair temperature will have an effective repair time.

Generally speaking, thermoset vitrimers (and thermoset materials in general) do not melt but rather undergo decomposition at very high temperatures, such as about 300° C. or higher. The repair temperature and repair time need to be selected to avoid thermal decomposition of the thermoset vitrimer. Preferably, the repair temperature is lower than the decomposition temperature of the thermoset vitrimer, which is the temperature at which degradation reactions are kinetically faster than the desired dynamic exchange reactions. In addition to temperature, other reaction conditions may play a role in the desired associative dynamic exchange versus the undesired decomposition—such as time, pressure, pH, and catalysts. At a given repair temperature, even slow decomposition may become significant if the repair time is too long.

The quality of the repair may be assessed by the degree of conservation of crosslink density following the repair process. The reason for this performance metric is that, in principle, purely associative dynamic bonding conserves crosslink density during rearrangement chemical reactions. The net number of bonds remains the same. By contrast, non-selective chemistry does not conserve crosslink density when there are decomposition reactions and/or dissociative dynamic covalent bond breakage with incomplete reformation of those bonds. Preferably, the associative dynamic bonding completely conserves crosslink density during rearrangement chemical reactions, which means the final crosslink density after repair is 100% of the initial crosslink density in the thermoset vitrimer. In some embodiments, the crosslink density after repair is from about 80% to 100% of the initial crosslink density in the thermoset vitrimer. In various embodiments, the crosslink density after repair is about, or at least about 50%, 60%, 70%, 80%, 90%, 95%, 99%, 99.5%, 99.9%, or 100% of the initial crosslink density in the thermoset vitrimer.

EXAMPLES

Materials for Examples.

Polypropylene glycol with average molecular weight $M_n$=425 g/mol (PPG-425) and 2000 g/mol (PPG-2000), tert-butyl acetoacetate, 1,5-diamino-2-methylpentane (DAMP), 4,4'-methylenebis(cyclohexyl isocyanate) (HMDI), and methyl isobutyl ketone (MIBK) are purchased from Sigma-Aldrich. Jeffamine D2000 ($M_n$=2000 g/mol) and Jeffamine D400 ($M_n$=430 g/mol) are supplied by Huntsman. Jeffamine® D-series diamines are polyether diamines based on a polypropylene glycol backbone. Hexatran-100 is supplied by Ascend. Hexatran-100 chemically is 4-(aminomethyl)octane-1,8-diamine.

Example 1: Synthesis of PPG-425 Amine-Terminated Vinylogous Urethane Oligomer.

PPG-425 (75.0 g, 4 mol eq), tert-butyl acetoacetate (55.8 g, 4 mol eq) and toluene (23 g) are added to a 2-neck 250-mL round-bottomed flask equipped with a Teflon mechanical stirrer, Dean-Stark trap, condenser, and $N_2$ purge. The contents in the round-bottomed flask are heated to about 130° C. and refluxed to remove tert-butanol condensate as a reaction product. After collecting 26.2 g of condensate (102% of ideal due to toluene), in about 80 minutes, the round-bottomed flask is cooled to room temperature (about 25° C.). DAMP (30.8 g, 6 mol eq) is added, and the Dean-Stark trap is filled with toluene. The contents in the round-bottomed flask are heated to reflux to remove water (6.4 mL, 101% of ideal) as a reaction product as well as toluene solvent, in about 90 minutes. After removing water, the Dean-Stark trap is emptied and the residual toluene is refluxed from the reaction vessel. After all toluene is removed, the contents are cooled to room temperature and stored under argon.

Figure 3:
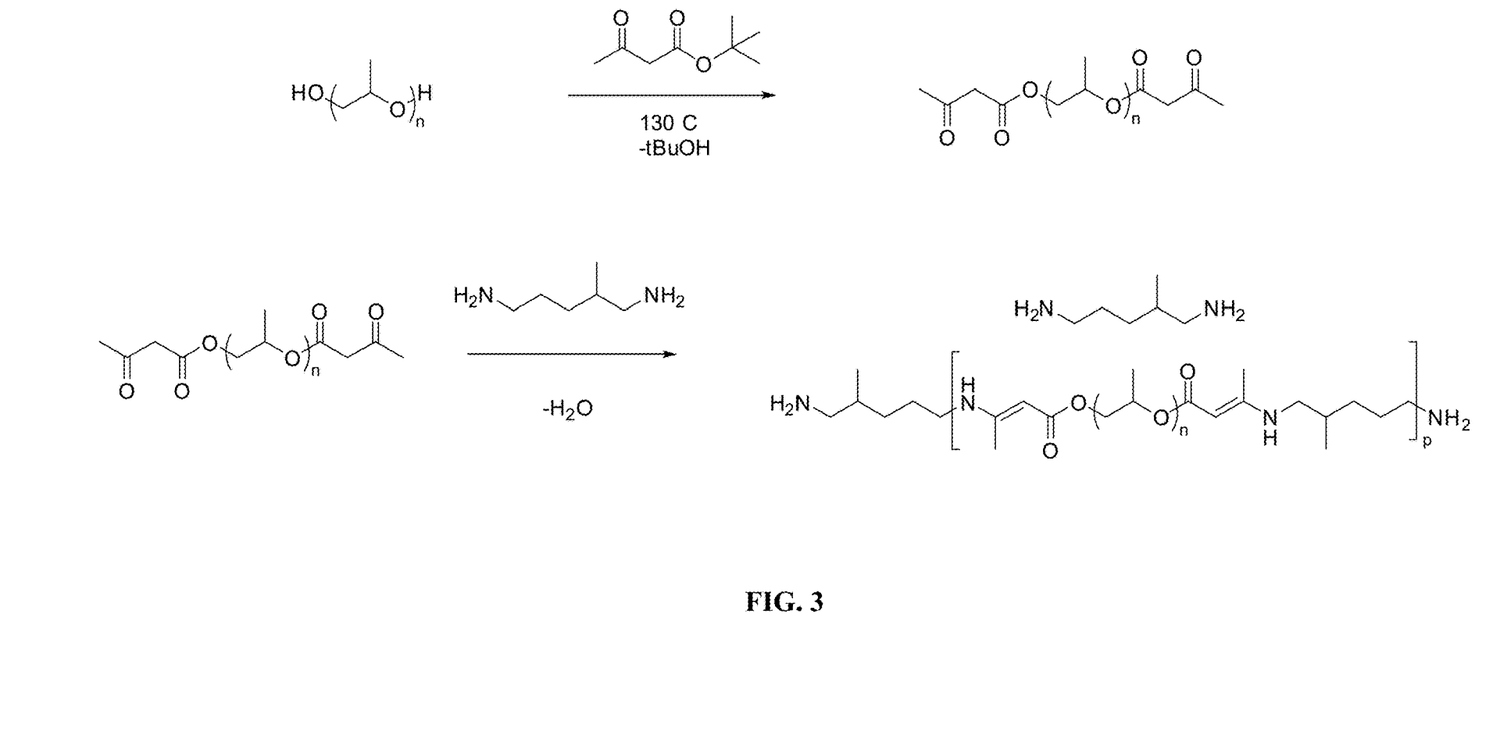
FIG. 3 depicts the chemical reactions accomplished in Example 1.

FIG. 3 depicts the chemistry of Example 1, with n equal to about 7. In the top reaction, the dynamic-bond precursor is formed to create the vinylogous urethane dynamic bonds. In the bottom reaction, an amine-terminated prepolymer is formed to force the dynamic bonds to the interior of the linear section. The amine-terminated prepolymer is an amine-terminated vinylogous urethane oligomer that contains dynamic bonds. The prepolymer has amine reactive end groups on both ends of the prepolymer.

Example 2: Synthesis of MIBK-Blocked Hexatran-100.

Hexatran-100 (107 g, 1 mol eq) and MIBK (559 g, 3 mol eq) are added to a 1-L round-bottomed flask equipped with a Teflon magnetic stirrer, Dean-Stark trap filled with MIBK, condenser, and $N_2$ purge. The contents in the round-bottomed flask are heated to reflux (about 116° C.) to remove water (33.4 g, 99.7% of ideal) as a reaction product, in about 24 hours. Residual MIBK is removed by refluxing and emptying the Dean-Stark trap. After removing the MIBK, the contents are cooled to room temperature and stored under argon. MIBK-blocked Hexatran-100, which chemically is MIBK-blocked 4-(aminomethyl)octane-1,8-diamine, is recovered.

Figure 4:
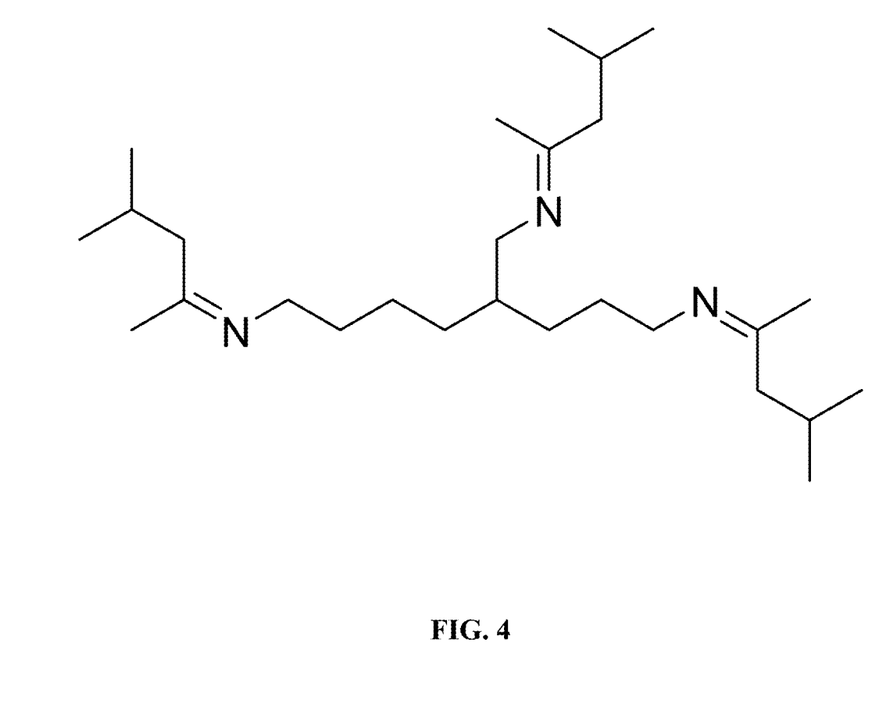
FIG. 4 depicts the MIBK-blocked Hexatran-100 produced in Example 2.

FIG. 4 depicts the MIBK-blocked Hexatran-100 produced in Example 2. The reaction of aldehydes or ketones with an amine forms an imine (a compound having a C=N group). Water is eliminated in the reaction. Thus, when MIBK reacts with the 4-(aminomethyl)octane-1,8-diamine, in the blocking reaction, oxygen is eliminated and therefore is not present in the structure of FIG. 4.

In this example, 4-(aminomethyl)octane-1,8-diamine creates non-dynamic bonds to be later added to the species containing dynamic bonds (i.e., the dynamic-bond precursor of Example 1).

Example 3: Synthesis of Polyurethane Containing 67% Dynamic Bonds.

In this example, polyurethane containing 67% dynamic bond content is synthesized. The dynamic bond content is calculated from the theoretical equivalent ratio of monomeric DAMP remaining after forming the oligomer in Example 1 (0.67 mol eq) to the chain-extended content containing internal dynamic vinylogous urea bonds in Example 1 (1.33 mol eq), as shown in the chemistry of FIG. 3.

The oligomer from Example 1 (6.00 g, 2.00 mol eq) and HMDI (2.152 g, 4.00 mol eq) are added to a FlackTek cup and mixed for 5 min at 2000 rpm. MIBK-blocked Hexatran-100 (1.345 g, 2.20 mol eq) is added to the mixture and mixed for 3 min at 2000 rpm. The resulting mixture is filmed at 80° C. on silanized Mylar and cured for 5 hours. The relative humidity is 63%.

Figure 5:
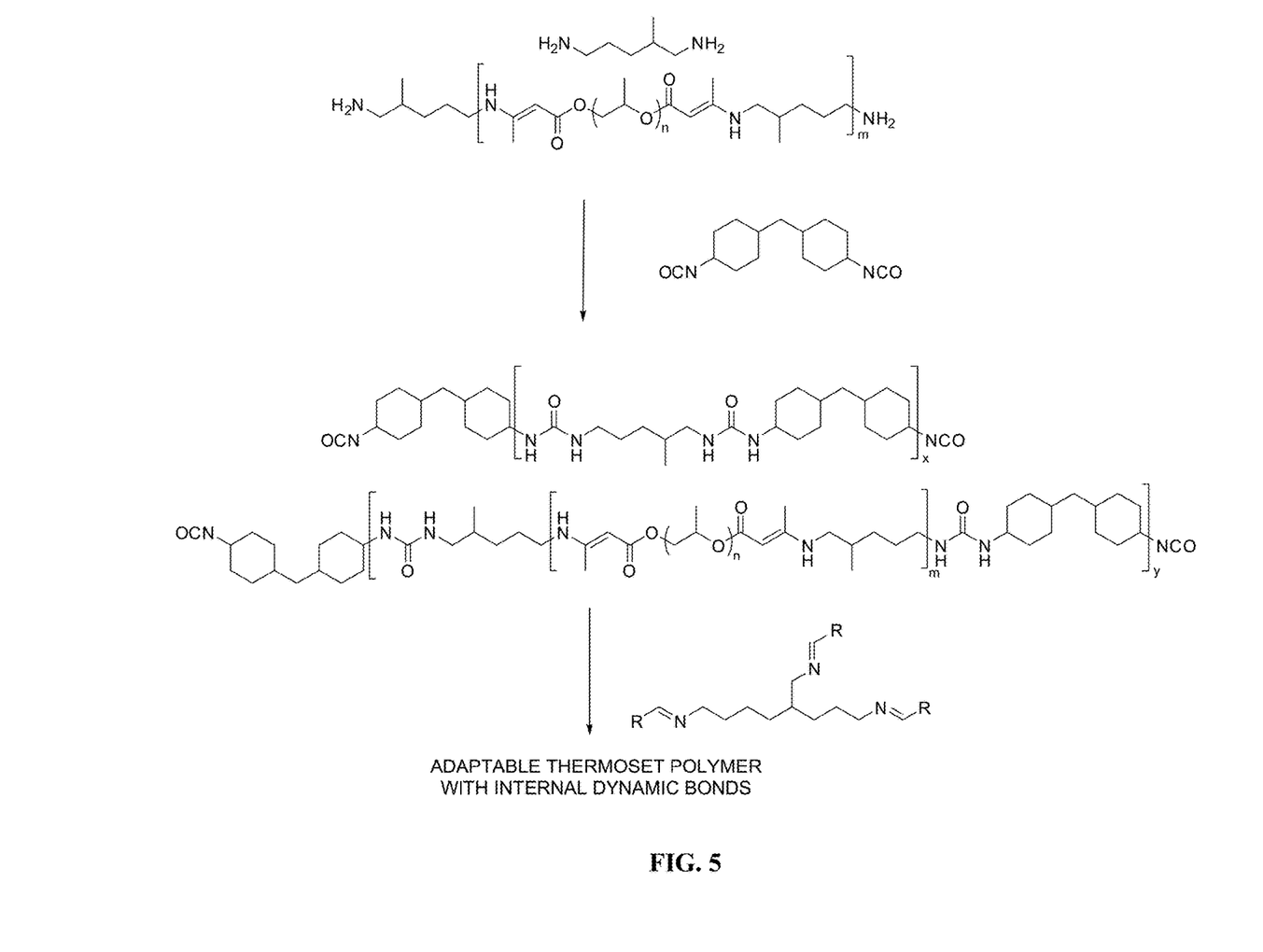
FIG. 5 depicts the chemical reactions in Examples 3, 4, and 5, forming an adaptable thermoset polymer with internal dynamic bonds (i.e., a thermoset vitrimer).

FIG. 5 depicts the chemical reactions taking place in Example 3. Note that in FIG. 5, the MIBK-blocked Hexatran-100 is shown with a general R group which may be derived from an aldehyde or ketone other than methyl isobutyl ketone, such as acetone.

HMDI is added in excess to endcap the polymer and then the isocyanate-endcapped polymer is reacted with the trifunctional amine species to crosslink the network with non-dynamic urea bonds. The trifunctional amine is originally blocked by imine groups that fall off in the presence of moisture when the film is laid down and exposed to the atmosphere. That is, C=N groups react with $H_2O$ to reform $NH_2$ and CO groups during curing.

In FIG. 5, the isocyanate-endcapped polymer reacts with the imine-containing molecule (i.e., the blocked 4-(aminomethyl)octane-1,8-diamine) to form a final polymer network referred to as "ADAPTABLE THERMOSET POLYMER WITH INTERNAL DYNAMIC BONDS" (structure not depicted). The thermoset polymer will be a randomly segmented copolymer that is linked together by the 4-(aminomethyl)octane-1,8-diamine).

The product in Example 3 is an adaptable thermoset polymer with internal dynamic bonds, wherein the polymer backbone contains about 67 mol% of associative dynamic covalently bonded vitrimeric species. This is an exemplary thermoset vitrimer according to embodiments of the invention.

Example 4: Synthesis of Polyurethane Containing 50% Dynamic Bonds.

In this example, polyurethane containing 50% dynamic bond content is synthesized. The dynamic bond content is calculated from the theoretical equivalent ratio of all monomeric DAMP (remaining after forming the oligomer in Example 1 (0.67 mol eq) plus additional DAMP (0.67 mol eq) to the chain-extended content containing internal dynamic vinylogous urea bonds in Example 1 (1.33 mol eq).

The oligomer from Example 1 (6.00 g, 2.00 mol eq), DAMP (0.159 g, 0.67 mol eq), and HMDI (2.869 g, 5.33 mol eq) are added to a FlackTek cup and mixed for 5 min at 2000 rpm. MIBK-blocked Hexatran-100 (1.794 g, 2.93 mol eq) is added to the mixture and mixed for 3 min at 2000 rpm. The resulting mixture us filmed at 80° C. on silanized Mylar and cured for 5 hours. The relative humidity is 63%. FIG. 5 depicts the chemical reactions taking place in Example 4.

HMDI is added in excess to endcap the polymer and then the isocyanate-endcapped polymer is reacted with the trifunctional amine species to crosslink the network with non-dynamic urea bonds. The trifunctional amine is originally blocked by imine groups that fall off in the presence of moisture when the film is laid down and exposed to the atmosphere. That is, C=N groups react with $H_2O$ to reform $NH_2$ and CO groups during curing.

The isocyanate-endcapped polymer reacts with the imine-containing molecule (i.e., the blocked 4-(aminomethyl)octane-1,8-diamine) to form a final polymer network referred to as "ADAPTABLE THERMOSET POLYMER WITH INTERNAL DYNAMIC BONDS" (structure not depicted) in FIG. 5. The thermoset polymer will be a randomly segmented copolymer that is linked together by the 4-(aminomethyl)octane-1,8-diamine).

The product in Example 4 is an adaptable thermoset polymer with internal dynamic bonds, wherein the polymer backbone contains about 50 mol% of associative dynamic covalently bonded vitrimeric species. This is an exemplary thermoset vitrimer according to embodiments of the invention.

Example 5: Synthesis of Polyurethane Containing 33% Dynamic Bonds.

In this example, polyurethane containing 30% dynamic bond content is synthesized. The dynamic bond content is calculated from the theoretical equivalent ratio of all monomeric DAMP (the amount remaining after forming the oligomer in Example 1 (0.67 mol eq) plus additional DAMP (2.00 mol eq) to the chain-extended content containing internal dynamic vinylogous urea bonds in Example 1 (1.33 mol eq).

The oligomer from Example 1 (6.00 g, 2 mol eq), DAMP (0.48 g, 2.00 mol eq), toluene (1.5 g), and HMDI (4.30 g, 8.00 mol eq) are added to a FlackTek cup and mixed for 5 min at 2000 rpm. MIBK-blocked Hexatran-100 (2.69 g, 4.40 mol eq) is added to the mixture and mixed for 3 min at 2000 rpm. The resulting mixture is filmed at 80° C. on silanized Mylar and cured for 5 hours. The relative humidity is 63%. FIG. 5 depicts the chemical reactions taking place in Example 5.

HMDI is added in excess to endcap the polymer and then the isocyanate-endcapped polymer is reacted with the trifunctional amine species to crosslink the network with non-dynamic urea bonds. The trifunctional amine is originally blocked by imine groups that fall off in the presence of moisture when the film is laid down and exposed to the atmosphere. That is, C=N groups react with $H_2O$ to reform $NH_2$ and CO groups during curing.

The isocyanate-endcapped polymer reacts with the imine-containing molecule (i.e., the blocked 4-(aminomethyl)octane-1,8-diamine) to form a final polymer network referred to as "ADAPTABLE THERMOSET POLYMER WITH INTERNAL DYNAMIC BONDS" (structure not depicted) in FIG. 5. The thermoset polymer will be a randomly segmented copolymer that is linked together by the 4-(aminomethyl)octane-1,8-diamine).

The product in Example 5 is an adaptable thermoset polymer with internal dynamic bonds, wherein the polymer backbone contains about 33 mol% of associative dynamic covalently bonded vitrimeric species. This is an exemplary thermoset vitrimer according to embodiments of the invention.

Comparative Example 1: Representative Polyurea System with No Dynamic Bonding.

Jeffamine D400 (7.5 g, 1 mol eq), Jeffamine D2000 (1.5 g, 1 mol eq), and HMDI (3.94 g, 4 mol eq) are added to a FlackTek cup and mixed for 5 min at 2000 rpm. MIBK-blocked Hexatran-100 (2.46 g, 2.2 mol eq) is added to the mixture and mixed for 3 min at 2000 rpm. The resulting mixture is filmed at 80° C. on silanized Mylar and cured for 5 hours. The relative humidity is 63%.

The product in Comparative Example 1 is a non-adaptable thermoset polymer with no internal dynamic bonds, wherein the linear polymer backbone contains 0 mol% of associative dynamic covalently bonded vitrimeric species.

Comparative Example 2: Representative Vitrimer with Crosslinks at Branch Points Using Dynamic Bonding.

PPG-425 (75.0 g, 4 mol eq), tert-butyl acetoacetate (55.8 g, 4 mol eq), and toluene (23 g) are added to a 2-neck 250-mL round-bottomed flask equipped with a Teflon mechanical stirrer, Dean-Stark trap, condenser, and $N_2$ purge. The contents in the round-bottomed flask are heated to reflux to remove tert-butanol condensate. After collecting 26.2 g of condensate (102% of ideal due to toluene), for about 80 minutes, the round-bottomed flask is cooled to room temperature. The contents (PPG425-AcAc) are dried under vacuum to remove toluene (24 hr) and stored under argon.

The PPG425-AcAc (4.00 g, 2 mol eq) and Hexatran-100 (0.82 g, 2.1 mol eq) are added to a FlackTek cup and mixed for 5 min at 2000 rpm. The resulting mixture is filmed at 80° C. on silanized Mylar and cured for 5 hours.

The product in Comparative Example 2 is a vitrimer with no internal dynamic bonds, wherein the linear polymer backbone contains 0 mol% of associative dynamic covalently bonded vitrimeric species. There are dynamic bonds only at crosslink points outside of the linear polymer backbone.

Example 6: Thermal Repair of Thermosets.

The thermoset vitrimers of Examples 3, 4, and 5 as well as Comparative Example 1, are subjected to a repair process as follows. For each sample material, two stacked, discrete films (of identical composition) are melt-pressed using a repair temperature of about 120° C. using a PHI Precision Press (PHI, City of Industry, California, USA).

Figure 6:
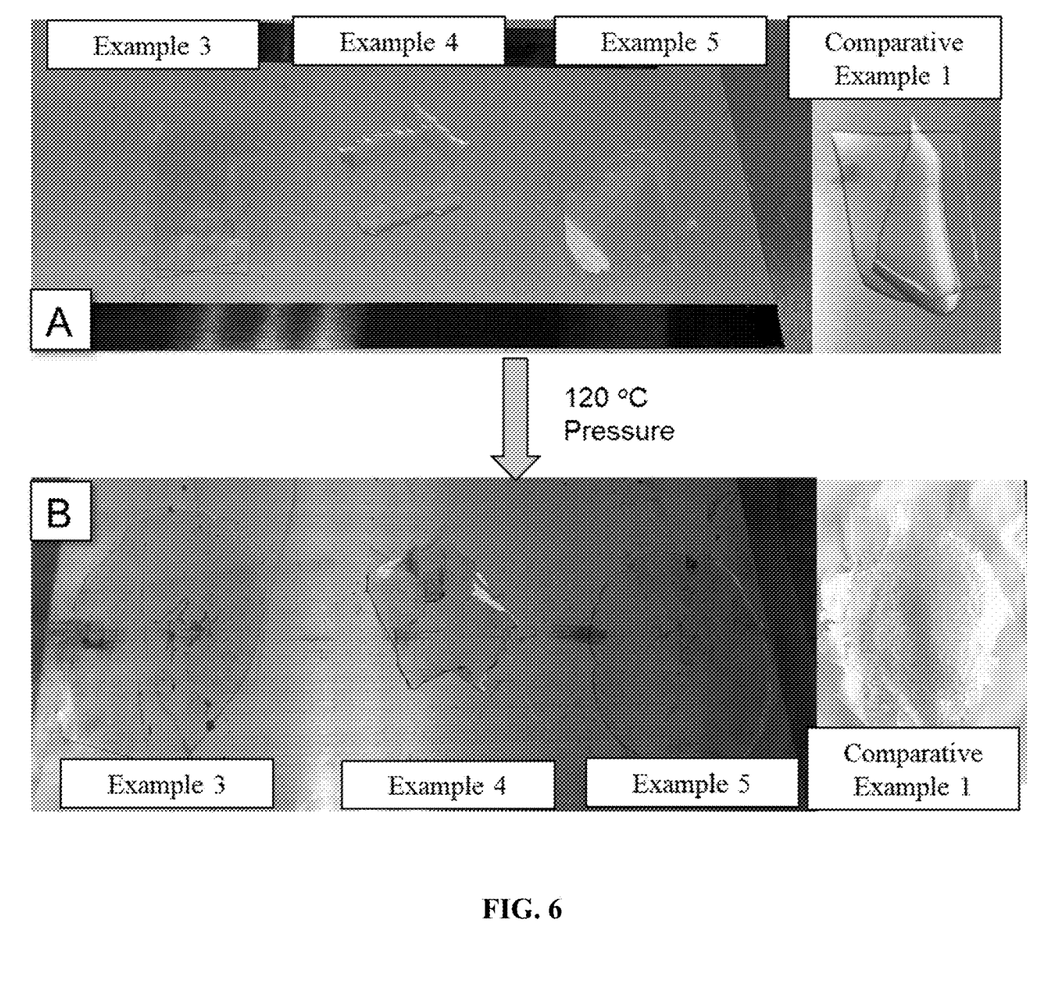
FIG. 6 presents a grayscale photograph comparing the self-repair ability of sample materials according to Examples 3, 4, and 5, as well as Comparative Example 1, demonstrating the effective polymer repair of the thermoset vitrimers of Examples 3, 4, and 5 but not of the polymer of Comparative Example 1.

FIG. 6 is a grayscale photograph comparing the self-repair ability of each sample material, assessed by conversion of the discrete films (photograph panel A) into repaired products (photograph panel B). In the case of each sample of Examples 3, 4, and 5, the two discrete films form a single homogeneous film following the repair process. By contrast, the sample of Comparative Example 1 appears to form a heterogeneous glob of material that has been mechanically disrupted or even shattered.

Adaptable materials with dynamic bonding which maintain key performance attributes are of interest for many potential applications including, but not limited to, rebondable/reworkable adhesives, repairable composites, and coatings or structures with improved longevity. The demonstrated associative covalent adaptive network formation of the disclosed thermoset vitrimers is suitable for a variety of fields, including electronics, adhesives, repairable composites, and transport and defense applications, for example.

Improved vitrimers, as well as methods of making and using the vitrimers, have been provided herein. The invented thermoset vitrimers are capable of being repaired after a period of use.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A thermoset vitrimer comprising:
    a linear polymer backbone containing a plurality of associative dynamic covalently bonded species, wherein said linear polymer backbone has a first terminal end and a second terminal end;
    a crosslinked network containing a first non-dynamic branch point and a second non-dynamic branch point, wherein said first non-dynamic branch point has a first branching functionality of at least 3;
    a first non-dynamic species between said first non-dynamic branch point and said first terminal end of said linear polymer backbone; and
    a second non-dynamic species between said second non-dynamic branch point and said second terminal end of said linear polymer backbone.

2. The thermoset vitrimer of claim 1, wherein said second non-dynamic branch point has a second branching functionality of at least 2.

3. The thermoset vitrimer of claim 2, wherein said second branching functionality is at least 3.

4. The thermoset vitrimer of claim 2, wherein said first branching functionality is the same as said second branching functionality.

5. The thermoset vitrimer of claim 2, wherein at least one of said first branching functionality and said second branching functionality is at least 4.

6. The thermoset vitrimer of claim 1, wherein said thermoset vitrimer comprises a plurality of first non-dynamic branch points and a plurality of second non-dynamic branch points.

7. The thermoset vitrimer of claim 6, wherein the number of said first non-dynamic branch points is the same as the number of said second non-dynamic branch points.

8. The thermoset vitrimer of claim 1, wherein said linear polymer backbone is characterized by a molecular distance between said first non-dynamic species and said second non-dynamic species of at least 100 g/mol.

9. The thermoset vitrimer of claim 8, wherein said molecular distance is at least 500 g/mol.

10. The thermoset vitrimer of claim 8, wherein said molecular distance is at least 1000 g/mol.

11. The thermoset vitrimer of claim 1, wherein said associative dynamic covalently bonded species are vinylogous urethanes and/or vinylogous ureas.

12. The thermoset vitrimer of claim 1, wherein said linear polymer backbone contains from about 5 mol% to 100 mol% of said associative dynamic covalently bonded species.

13. The thermoset vitrimer of claim 12, wherein said linear polymer backbone contains at least 50 mol% of said associative dynamic covalently bonded species.

14. The thermoset vitrimer of claim 12, wherein said linear polymer backbone contains at least 90 mol% of said associative dynamic covalently bonded species.

15. The thermoset vitrimer of claim 1, wherein said first non-dynamic species is selected from the group consisting of ureas, urethanes, esters, amides, imides, oxalamides, epoxies, acrylates, and combinations thereof.

16. The thermoset vitrimer of claim 1, wherein said second non-dynamic species is selected from the group consisting of ureas, urethanes, esters, amides, imides, oxalamides, epoxies, acrylates, and combinations thereof.

17. The thermoset vitrimer of claim 1, wherein said first non-dynamic species is the same as said second non-dynamic species.

18. The thermoset vitrimer of claim 1, wherein said first non-dynamic species and said second non-dynamic species are each selected from ureas, urethanes, or a combination of ureas and urethanes.

19. The thermoset vitrimer of claim 1, wherein said first non-dynamic species and said second non-dynamic species are formed from trifunctional amine species and/or from trifunctional blocked amine species.

20. The thermoset vitrimer of claim 19, wherein said trifunctional amine species is 4-(aminomethyl)octane-1,8-diamine, and wherein said trifunctional blocked amine species is MIBK-blocked 4-(aminomethyl)octane-1,8-diamine.

21. A method of making a thermoset vitrimer, said method comprising:
   (a) preparing a linear prepolymer;
   (b) reacting said linear prepolymer with an amine-containing species to form an amine-terminated linear prepolymer;
   (c) reacting said amine-terminated linear prepolymer with an isocyanate-containing species to form an isocyanate-endcapped linear prepolymer;
   (d) mixing said isocyanate-endcapped linear prepolymer with a reactive crosslinking agent having a crosslinking functionality of at least 3; and
   (e) curing said isocyanate-endcapped linear prepolymer with said reactive crosslinking agent, thereby forming a thermoset vitrimer.

22. The method of claim 21, wherein said isocyanate-containing species acts as a polymer chain extender.

23. The method of claim 21, wherein said isocyanate-containing species is a multifunctional isocyanate species.

24. The method of claim 21, wherein said reactive crosslinking agent is a trifunctional amine species and/or a trifunctional blocked amine species.

25. The method of claim 24, wherein said trifunctional amine species is 4-(aminomethyl)octane-1,8-diamine, and wherein said trifunctional blocked amine species is MIBK-blocked 4-(aminomethyl)octane-1,8-diamine.

26. The method of claim 21, wherein said linear prepolymer contains from about 5 mol% to 100 mol% of associative dynamic covalently bonded species.

27. The method of claim 21, wherein step (e) includes exposure to heat and humidity.

28. The method of claim 21, wherein step (e) utilizes a curing temperature from about 40° C. to about 140° C.

29. The method of claim 21, wherein step (e) utilizes a curing humidity from about 10% to 100%.

30. The method of claim 21, wherein said isocyanate-endcapped linear prepolymer is applied to a surface prior to step (e), and optionally wherein said isocyanate-endcapped linear prepolymer is filmed or sprayed onto said surface.

* * * * *